(12) United States Patent
Matsumoto

(10) Patent No.: US 9,846,453 B2
(45) Date of Patent: Dec. 19, 2017

(54) WEARABLE TERMINAL WITH TOUCHPAD INTERFACE AND POWER-SAVING MODE

(71) Applicant: Yoshinori Matsumoto, Osaka (JP)

(72) Inventor: Yoshinori Matsumoto, Osaka (JP)

( * ) Notice: Subject to any disclaimer, the term of this patent is extended or adjusted under 35 U.S.C. 154(b) by 307 days.

(21) Appl. No.: 14/677,586

(22) Filed: Apr. 2, 2015

(65) Prior Publication Data

US 2015/0286246 A1 Oct. 8, 2015

(30) Foreign Application Priority Data

Apr. 8, 2014 (JP) ................................. 2014-079080
Oct. 29, 2014 (JP) ................................. 2014-219947

(51) Int. Cl.
*G06F 1/16* (2006.01)
*G06F 3/0488* (2013.01)
*H04W 52/02* (2009.01)

(52) U.S. Cl.
CPC ............ *G06F 1/163* (2013.01); *G06F 3/0488* (2013.01); *H04W 52/0254* (2013.01); *Y02B 60/50* (2013.01)

(58) Field of Classification Search
CPC .. G06F 1/163; G06F 3/0488; H04W 52/0254; Y02B 60/50
See application file for complete search history.

(56) References Cited

U.S. PATENT DOCUMENTS

| 6,809,724 B1 * | 10/2004 | Shiraishi | G06F 1/163 345/157 |
| 8,199,104 B2 | 6/2012 | Park et al. | |
| 8,827,784 B2 | 9/2014 | Kotsugai et al. | |
| 2009/0113495 A1 * | 4/2009 | Kim, II | H04N 5/44513 725/80 |
| 2012/0231884 A1 | 9/2012 | Sakai | |
| 2013/0044215 A1 * | 2/2013 | Rothkopf | G06F 1/163 348/143 |
| 2014/0078086 A1 * | 3/2014 | Bledsoe | G06F 3/041 345/173 |

FOREIGN PATENT DOCUMENTS

| JP | H11238039 | 8/1999 |
| JP | 2004295716 | 10/2004 |
| JP | 2013198107 | 9/2013 |

OTHER PUBLICATIONS

Office Action dated Feb. 15, 2017 issued in connection with Japanese Patent Application No. 2014-219947.

* cited by examiner

*Primary Examiner* — Ryan A Lubit
(74) *Attorney, Agent, or Firm* — KMF Patent Services, PLLC; Kenneth Fagin; Stanley Konzel

(57) ABSTRACT

To provide a wearable information terminal enables to reduce power consumption and to improve operability. A wearable information terminal 1 wearable around a user's arm having a display 11, a touch pad 12 on the outside to the opposite position of the display 11 when worn on the user's arm, a sensor 13 detecting an inclination of the wearable information terminal 1 against a reference axis, and a controller 3 to show a pointer icon 110 at a position corresponding to an operation position on the display 11 when an operation to the touch pad 12 is detected and to switch the display 11 to an energy saving mode in case the inclination is within a predetermined range and the operation to the touch pad 12 is undetected.

6 Claims, 11 Drawing Sheets

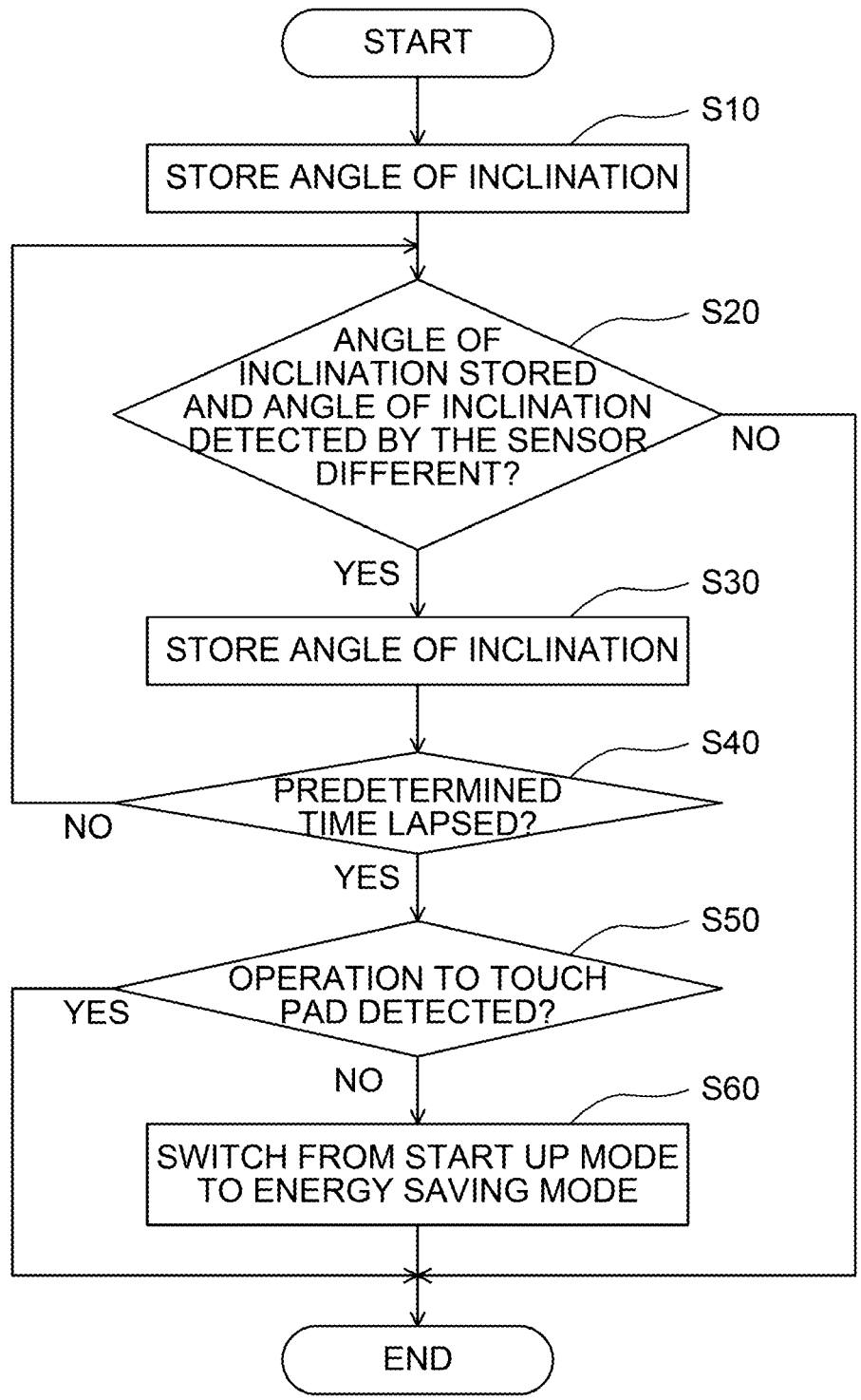

WEARABLE TERMINAL WITH TOUCHPAD INTERFACE AND POWER-SAVING MODE

CROSS-REFERENCE TO RELATED APPLICATIONS

This application claims the benefit of Japanese Patent Application Nos. 2014-079080 filed Apr. 8, 2014, and 2014-219947 filed Oct. 29, 2014, the contents of both of which are incorporated herein by reference in their entirety.

FIELD OF THE INVENTION

The present invention relates generally to a wearable terminal.

BACKGROUND OF THE INVENTION

Recent years, a trend of consumed energy is increasing due to high and multi-function of handheld device such as wearable information terminal. However, it is difficult to have a battery with larger capacity in view of the size and weight of the handheld device.

For example, the reference 1 discloses, by detecting usage of a user and in accordance to the detected usage of the user, a wrist watch type information terminal setting one of first mode restricting a display of information to display means and forbidding input operation to input means, second mode allowing the display of information to the display means and forbidding input operation to the input means, or third mode allowing the display of information to the display means and input operation to the input means, to reduce the energy consumption and to prevent any incorrect operation as well as to prevent any circumstances where operator's view is narrowed by keeping operating the information terminal.

In recent years, a touch panel, which allows easy operation with a touch of a finger on a screen, is often used for handheld devices such as wearable information terminals. Therefore, as the handheld device itself will be covered with the operating finger, it may be difficult to recognize face to detect the usage of the user as described in the reference 1. Further, with a small wearable information terminal, the screen will be covered with the operating finger and it may be even more difficult to operate.

Therefore, it is an object of the present invention to provide a wearable information terminal which enables to reduce energy consumption and to improve the operability.

BRIEF SUMMARY OF THE INVENTION

An aspect of the present invention is to provide a wearable information terminal wearable around a user's arm having a display, a touch pad existing on an outer surface at a position facing the display when worn on the user's arm, a sensor configured to detect an inclination of the wearable information terminal against a reference axis, and a controller which causes the display to display thereon a pointer icon at a position corresponding to an operation position when an operation to the touch pad is detected and to switch the display to an energy saving mode in case the inclination is within a predetermined range and the operation to the touch pad is undetected.

According to the above configuration, the touch pad is located at the back of the display and the pointer icon corresponding to the location operated on the touch pad is shown. This improves the operability as it enables to operate without covering the display with the user's finger and the operated location is shown on the display with the pointer icon. It also enables to reduce the energy consumption as it allows switching to an energy saving mode when the wearable information terminal is within the inclination of the predetermined range when the touch pad is not operated.

Another aspect of the present invention is to provide a battery charging system comprising the above described wearable information terminal and a battery charger to charge an energy-storing member (e.g., a battery) contained within the wearable information terminal; the battery charger comprising a housing able to hold the wearable information terminal in which the reference axis is fixed, and a battery charger side port portion provided to the housing configured to be connected to the wearable information terminal; the wearable information terminal comprising an information terminal side port portion configured to be connected to the battery charger side port portion on the battery charger when held on the housing; and the controller resetting the reference axis when the power supply is detected by connecting the information terminal side port portion to the charger side port portion.

In general, a sensor detecting the inclination may have the reference axis shifted due to an intense movement. According to the above configuration, the reference axis is automatically reset when charging and it is not necessary for the user to reset consciously. Further, as it is done when charging, the battery will not die when setting and it will prevent any failure deriving from it.

Another aspect of the present invention is to provide the controller to switch the display to an energy saving mode in case the inclination against the reference axis detected by the sensor changes according to the lapsed time and this state of change continues for a predetermined time and in case the operation to the touch pad is undetected.

According to the above configuration, when the inclination against the reference axis keeps changing and the operation to the touch pad is undetected, it may be possible that the user is walking or exercising with the wearable terminal wound around the arm without operating. In such case, by transitioning to the energy saving mode, it enables to reduce unnecessary energy consumption in case the user is not intending to operate the wearable terminal.

Another aspect of the present invention is to provide the display able to display an object selectable in the touch pad and the controller causes the object to be selected in case the pointer icon is on the object and the inclination detected by the sensor has changed.

According to the above configuration, when the object is selected using the pointer icon, it is possible to move the pointer icon with touch pad and the selection action will be done only by inclining the wearable terminal without any operation to touch pad.

Another aspect of the present invention is to provide the object which is an icon for starting an application and the controller is to cause the application to be started related to the icon in case the icon is selected.

In general, an area of the display of the wearable terminal which to wind around the arm is small and, therefore, an operation area becomes smaller when operating with the touch pad and a detailed operation is required on the touch pad. According to the above configuration, when starting an application, it is just necessary to move the pointer icon onto the icon as an operation on the touch pad and it enables an easy operation when starting the application.

Another aspect of the present invention is having a change portion which enables to change a moving speed of the pointer icon and the controller controls the change of the moving speed of the pointer icon with the change portion in case the operation to the touch pad is stationary.

According to the above configuration, for example, it becomes easy to operate the pointer icon when selecting an object shown on the display by changing the pointer icon's moving speed to a slower speed than the usual speed.

BRIEF DESCRIPTION OF THE DRAWINGS

The nature and mode of operation of the present invention will now be more fully described in the following detailed description of the invention taken with the accompanying drawing figures, in which:

FIG. 7 shows a processing flow of a second energy saving mode transition movement executed by the wearable information terminal;

DETAILED DESCRIPTION OF THE PREFERRED EMBODIMENT

It should be appreciated that, in the detailed description of the invention that follows, like reference numbers on different drawing views are intended to identify identical structural elements of the invention in the respective views.

Figure 1:
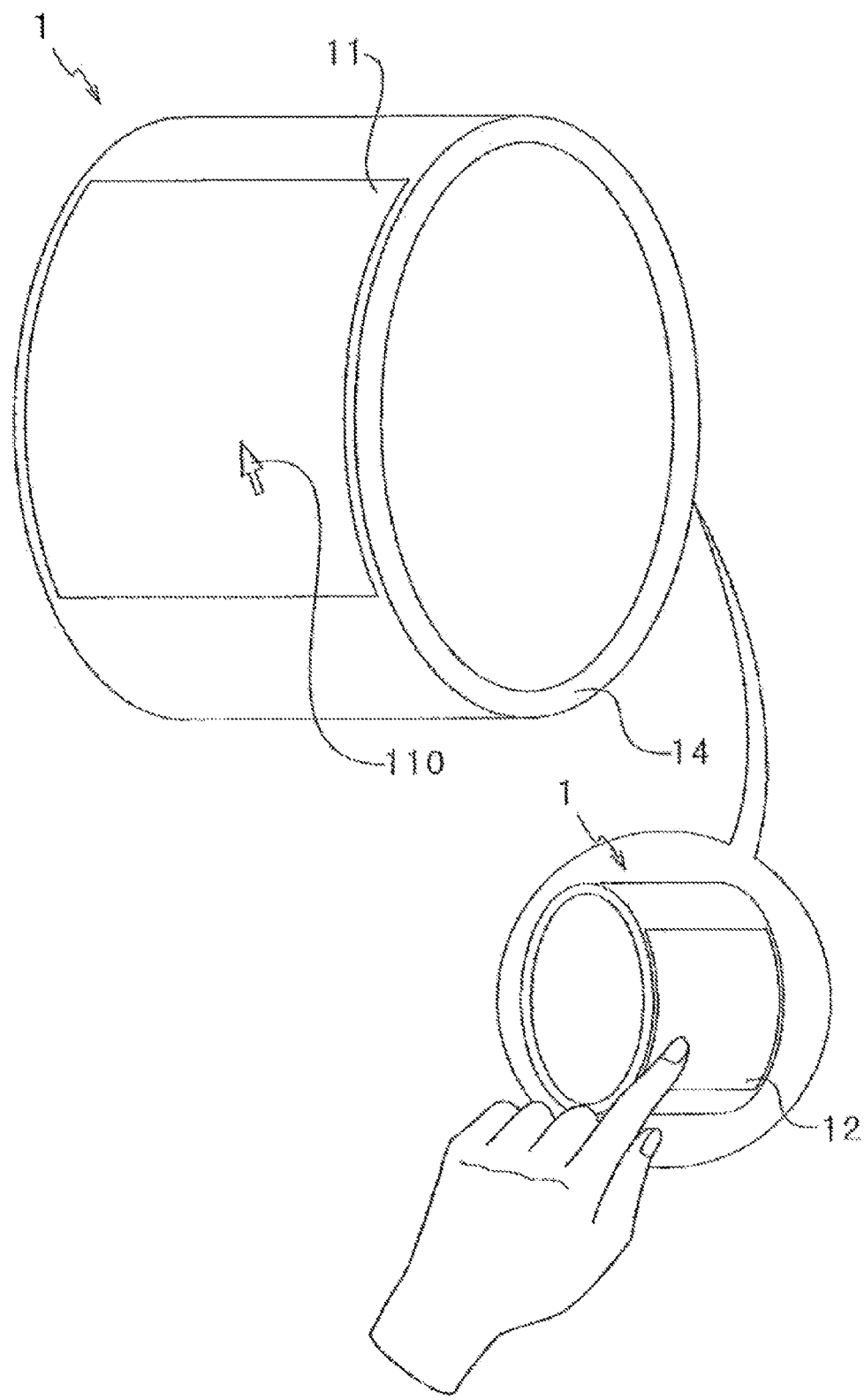
FIG. 1 is a schematic view of a wearable information terminal of the present embodiment.

A wearable information terminal 1 of the present embodiment is an information terminal wearable on a user's arm. As shown in FIG. 1, the wearable information terminal 1 comprises of a display 11, a touch pad 12 located outside of the opposite position of the display 11 when worn on the user's arm, and a sensor 13 (referring to FIG. 3) detecting an inclination of the wearable information terminal 1 against a reference axis. The wearable information terminal 1 has a function to show a pointer icon 110 on a location corresponding to an operation location in the display 11 in case an operation to the touch pad 12 is detected. The wearable information terminal 1 also has a function to switch the display 11 into energy saving mode in case the inclination of the wearable information device 1 against the reference axis is within the predetermined range and the operation to the touch pad is undetected. Further, the touch pad may be provided at the back of a tablet type information terminal and may be applied to this.

Here, the display 11 is not restricted to be provided just one and, for example, plurality of displays may be provided outside of a terminal housing 14 of the wearable information terminal 1 formed in a circular manner. The display 11 may also be formed with the displays outside the housing 10 of the wearable information terminal 1 and plurality may be provided to cover the outside. In this case, the display 11 itself may be provided with a function of the touch pad 12. That is, the touch pad 12 may be a touch panel provided on the display 11 and it may be provided to cover entire or a part of the display 11.

Although not shown in figures, a sensor 13 is a gyro sensor, an acceleration sensor or the like. The wearable information terminal 1 is able to detect the inclination of the wearable information terminal 1 against the reference axis by having one or multiple sensors.

"The inclination of the wearable information terminal 1 within the predetermined range" shows a position of the wearable information terminal 1 in, so called, unused state. The predetermined range may be set by the user or may be automatically set by the user's usage history. Further, it may be switchable according to a plurality of pre-set predetermined ranges by detecting the user's position (such as upright position, sitting position, face down position, face up position, and recumbent position).

In this way, in the wearable information terminal 1, the touch pad 12 is arranged outside of the opposite position of the display 11 and the pointer icon 110 is shown according to the position operated with the touch pad 12. In this manner, it is possible to operate the display 11 without covering with user's finger and as the operation position is shown with the pointer icon 110 on the display 11, the operability is improved. Further, as it is possible to switch to energy saving mode when the wearable information terminal 1 is inclined to the predetermined range when the touch pad 12 is not in use, it is possible to reduce the energy consumption.

Figure 2A:
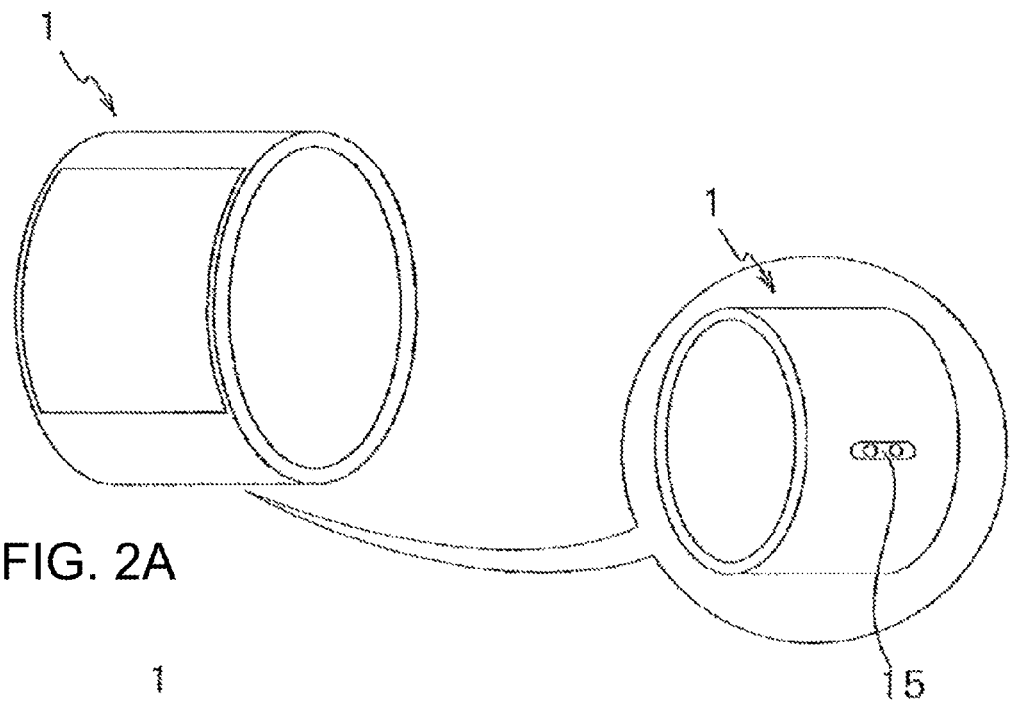
FIGS. 2A and 2B are schematic views illustrating a battery charging system of the present embodiment.
Figure 2B:
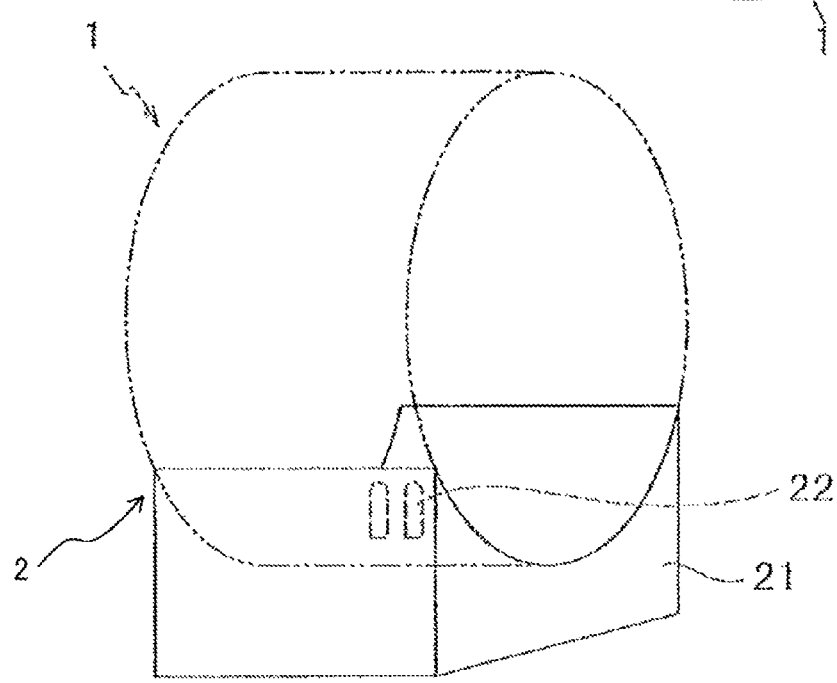

Further, an energy-storing member (e.g., a battery) housed within the wearable information terminal 1 of the present embodiment is able to be charged with a battery charger 2 connected to a commercial power point (not shown) as shown in FIGS. 2A and 2B. That is to say, a battery charging system 10 comprising of the wearable information terminal 1 and the battery charger 2 charging the wearable information terminal connected to the commercial power point is configured.

The battery charger 2 comprises of a battery charger housing 21 capable of holding the wearable information terminal 1 in which the reference axis is fixed and a battery charger side port portion 22 provided in the battery charger housing 21 to connect to the wearable information terminal 1. On the other hand, the wearable information terminal 1 comprises of an information terminal side port portion 15 to connect to the battery charger side port portion 22 of the battery charger 2 in a held state to the battery charger housing 21. Further, the wearable information terminal 1 reset the reference axis when the information terminal side port portion 15 is connected to the battery charger side port portion 22 and the power supply is detected.

As such, the wearable information terminal 1 automatically reset the reference axis when charging, it is not necessary for the user to consciously reset. Further, there will not be a case where battery goes flat when setting as resetting of the reference axis is done when charging and defect or failure due to the above may be prevented.

Separately from the wearable information terminal 1, an application may be provided. That is to say, the present invention may be provided as a program to have a computer such as tablet terminal to function as an indication means to indicate the pointer icon in a position corresponding to an operation position in the display when the operation to the touch pad is detected and an energy saving mode switch means to switch the display to energy saving mode when the inclination against the reference axis is within the predetermined range and the operation to the touch pad is undetected. Further, the touch pad is not restricted to exist outside of the opposite position of the display and it may be a tablet terminal having only a touch pad (touch panel) on the display.

(Configuration of the Wearable Information Terminal 1)
The wearable information terminal 1 shown in the above outline will be explained in details.

Figure 3:
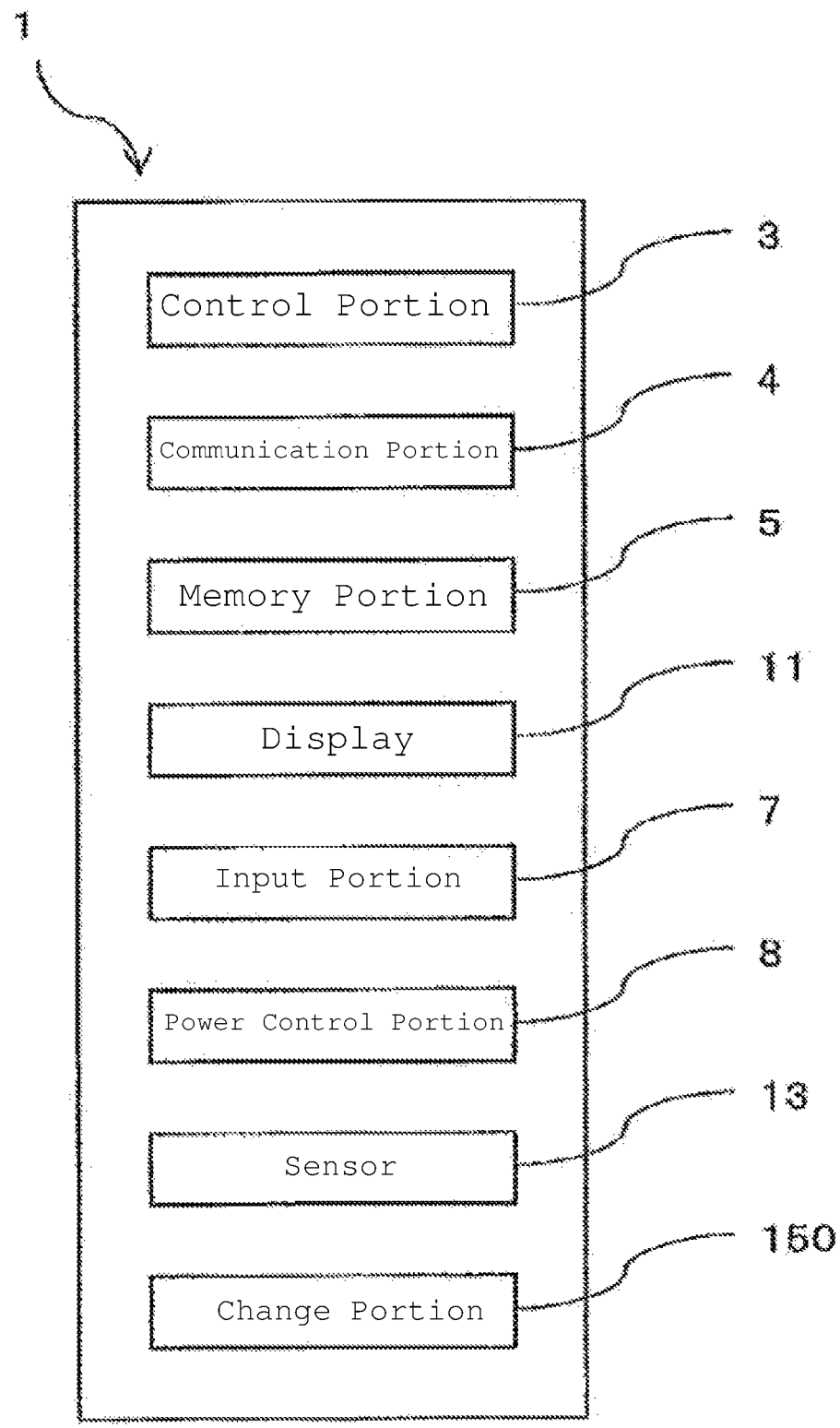
FIG. 3 shows a configuration of the wearable information terminal.

As shown in FIG. 3, the wearable information terminal 1 comprises of a control portion 3, a communication portion 4, a memory portion 5, the display 11, an input portion 7, a power control portion 8, and the sensor 13.

The control portion 3 comprises of CPU (Central Processing Unit), RAM (Random Access Memory), ROM (Read Only Memory) or the like. The communication portion 4 comprises a wireless communication device and transmit and receive data with an antenna which is not shown. The memory portion 5 comprises of either or both HDD (Hard Disk Drive) and SSD (Solid State Drive). The display 11 is a liquid crystal display or an organic light emitting display showing an image and is provided either or both of these. Further, as described in the above, an object is shown on the display 11. The object is an indicated item shown on the wearable information terminal 1 and for example, it is a file stored in the wearable information terminal 1, icons shown in the applications available in the wearable information terminal 1 and the like.

In the present embodiment, the input portion 7 is a button (not shown) or the touch pad 12 receiving an input from the user. Further, it may be included if a touch panel is provided on the display separately from the touch pad.

The power control portion 8 comprises of a battery and the like to supply power to activate the wearable information terminal 1.

The wearable information terminal 1 realizes the functions below with the control portion 3 as a controller. Specifically, the wearable information terminal 1 comprises of an inclination detection function (means) to detect the inclination of the wearable information terminal 1 against the reference axis, an icon indication function (means) to indicate the pointer icon 110 at a position corresponding to an operation position in the display 11 in case the operation to the touch pad 12 is detected, and an energy saving mode switch function (means) to switch the display 11 to the energy saving mode in case the inclination of the wearable information terminal against the reference axis is within the predetermined range and the operation to the touch pad 12 is undetected.

The inclination detection function is a function to detect the inclination against the reference axis set on the wearable information terminal 1. The reference axis, for example, is set to the lateral operation direction of the display 11.

The icon indication function is a function to indicate the pointer icon 110 on the display 11 according to the input operation to the touch pad 12. As the touch pad 12 is located at the back of the display and is operated from the back, when it is operated sliding to the right direction from the touch pad 12, it indicates as sliding to the left in the display 11. As such, it is preferable that the indication of the pointer icon 110 on the display 11 is shown in the opposite direction for lateral direction to the input operation to the touch pad 12.

The energy saving mode switch function has a function to detect whether the inclination of the wearable information terminal against the reference axis is within the predetermined range. For example, in a case where the reference axis is set on horizontal operation direction of the display 11 is close to vertical, the arm with the wearable information terminal 1 is down and it may be determined that it is unused. That is to say, the inclination of the wearable information terminal 1 to be within the predetermined range including vertical, it makes it possible to determine whether the wearable information terminal 1 is in use or unused.

The energy saving mode switch function has a function to determine whether the operation to the touch pad 12 is undetected or not. The transition to the energy saving mode is preferable to be done after a predetermined time has lapsed since the operation to the touch pad 12 is undetected.

Further, as mentioned above, the energy saving mode switch function has a function to make the display 11 of the wearable information terminal 1 to the energy saving (sleep) state. The energy saving mode switch function may be a function to stop the power supply from the power control portion 8 not only to the display 11 but to all internal devices. In this case, it is preferable to at least detect the operation from outside to the input portion 7, then to have the function to start the wearable information terminal 1 to be in an active state (a state where the power is supplied) with this queue. That is to say, the energy saving mode switch function has a function to switch the wearable information terminal 1 or the display 11 in to start up state (start mode).

(Movement of the Wearable Information Terminal 1)
Next, the movement of the control portion 3 of the wearable information terminal 1 is explained.

Figure 4:
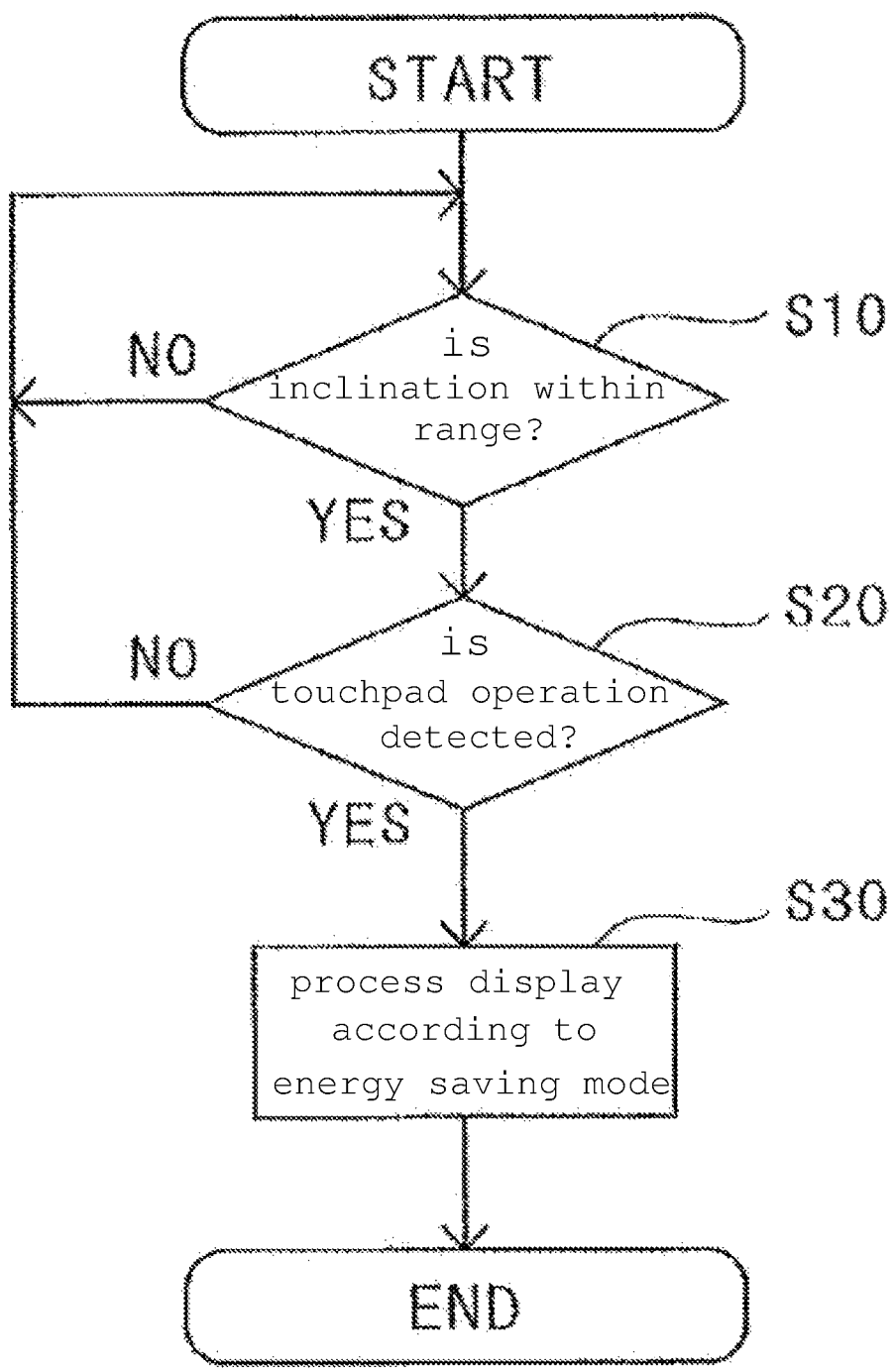
FIG. 4 shows a processing flow to execute the wearable information terminal.

(Energy Saving Mode Transition Movement)
FIG. 4 is a flowchart showing the energy saving mode transition movement of the wearable information terminal 1. As shown in FIG. 4, first, the control portion 3 receives a signal from the sensor 13 showing the inclination of the wearable information terminal 1 to determine whether the inclination of the wearable information terminal 1 is within the predetermined range (S10). The predetermined range is stored in advance in the memory portion 5. In case where the inclination of the wearable information terminal 1 is not within the predetermined range (S10: NO), it returns to the process of Step S10.

On the other hand, in case the inclination of the wearable information terminal 1 is within the predetermined range (S10: YES), the control portion 3 determines whether the operation to the touch pad 12 is undetected (S20). In case the operation to the touch pad 12 is not undetected (during operation) (S20: NO), it returns to the process of Step S10.

On the other hand, in case the operation to the touch pad 12 is undetected (S20: YES), the display 11 is processed to the energy saving mode (S30).

The order of determination of Step S10 and Step S20 may be reverse or may be simultaneous.

Further, in the energy saving mode, in case the control portion 3 detects an operation to the touch pad 12, the display 11 starts up and transitions to the start up mode (not shown).

(Movement of the Battery Charging)
When the wearable information terminal 1 is connected to the battery charger 2, the control portion 3 detects that it has been connected to the battery charger 2 in a state it is mounted to the battery charger housing 21. That is to say, the battery charger 2 has a configuration to transmit a signal to the wearable information terminal 1 when it is connected to the wearable information terminal 1. Further, in this state, it is possible to maintain the reference axis in place with the control portion 3 resetting the reference axis.

By conducting the above process, it is possible to automatically transmit and receive data by improving the communication quality even if the user is under a poor communication quality environment. Therefore, the user may automatically transmit and receive data when the communication quality improves, which does not require to transition from sleep mode to the normal state unnecessarily, and it allows to reduce power consumption.

(Operation Method of the Touch Pad)

Figure 5:
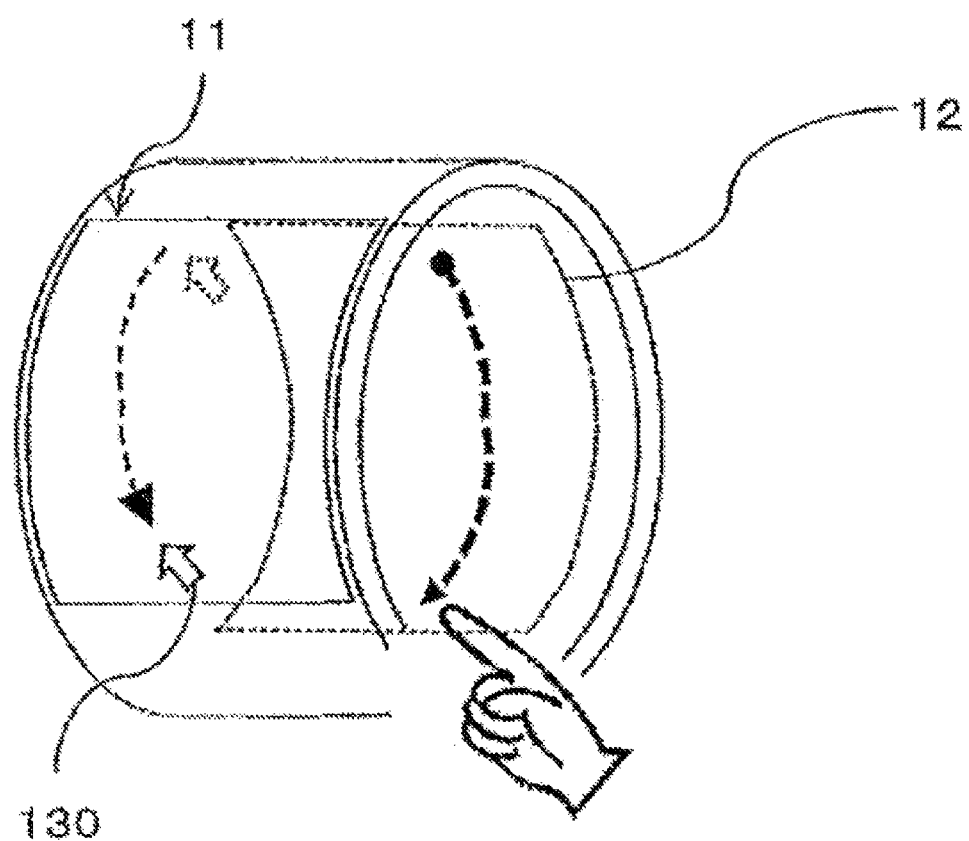
FIG. 5 explains an operation method of the touch pad of the wearable information terminal.

The operation method of the touch pad is explained using FIG. 5. The user makes contact with the touch pad 12 with his finger and by moving his finger in a contact state, the pointer icon 110 shown on the display 11 moves according to the movement of the finger. For example, if the finger is moved from the upper part of the touch pad 12 to the lower part, the pointer icon 110 moves from the upper part to the lower part of the display 11 accordingly.

(Operation Method of Handwriting Recognition)

An input method of a character string using handwriting recognition is explained using FIGS. 6A through 6E. The handwriting recognition is an input method to input an arbitrary character string using the touch pad to conduct a matching process with the character database according to the predetermined algorithm, then to convert the handwritten character string into a character string usable in an application.

Figure 6A:
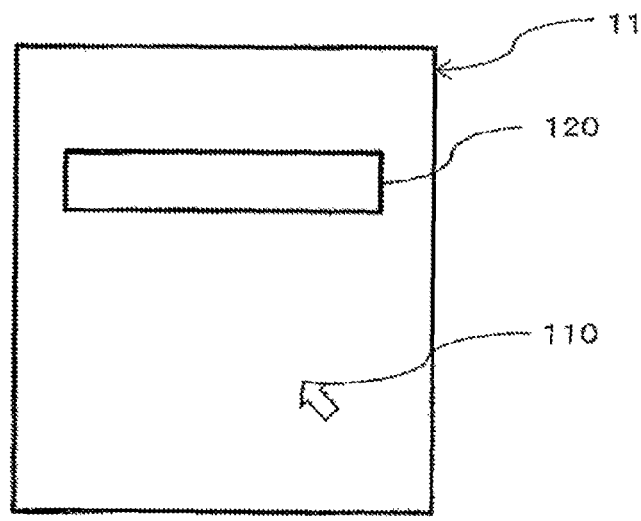
FIGS. 6A through 6E explain an entry method of the hand writing recognition of the wearable information terminal.
Figure 6B:
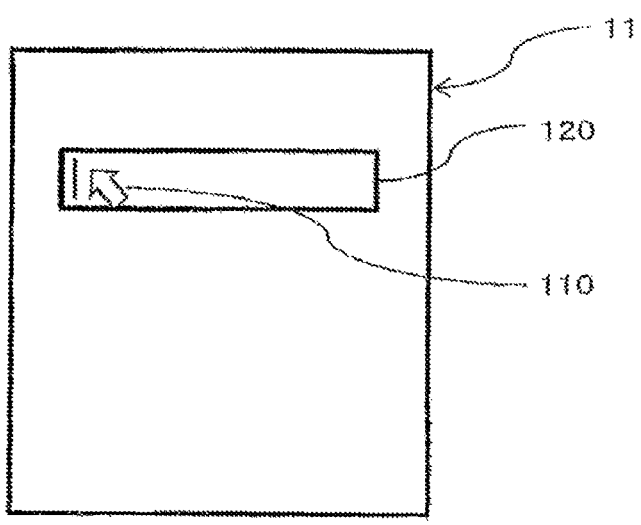
Figure 6C:
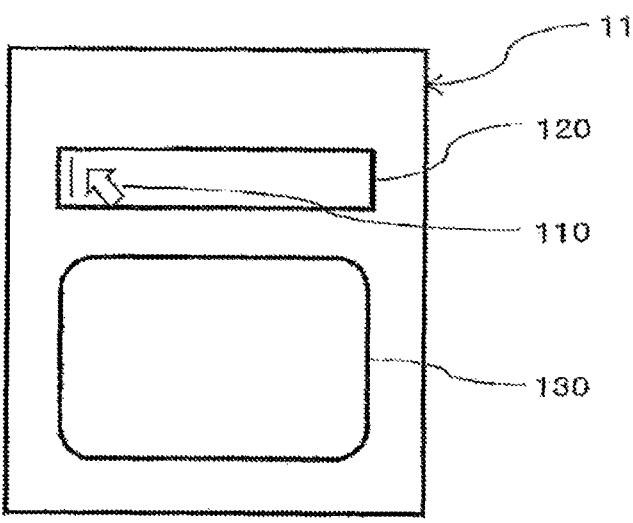

On the display 11, a text box 120 to input a character string to be used in an application is shown (FIG. 6A). The user selects the text box 120 using the pointer icon 110 to enter a state waiting for the input of character string (FIG. 6B). In order to recognize the handwriting, an input from the input portion 7 or an operation from the touch pad 12 is conducted to show a handwriting recognition area 130 (FIG. 6C).

Figure 6D:
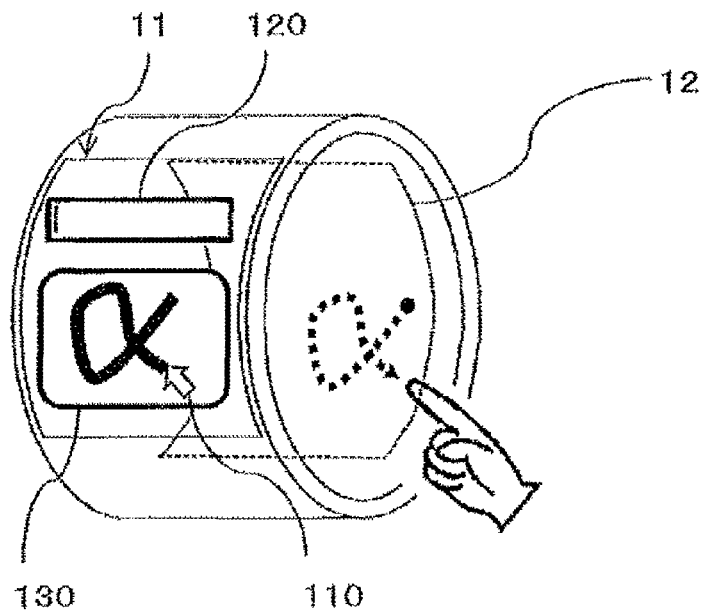
Figure 6E:
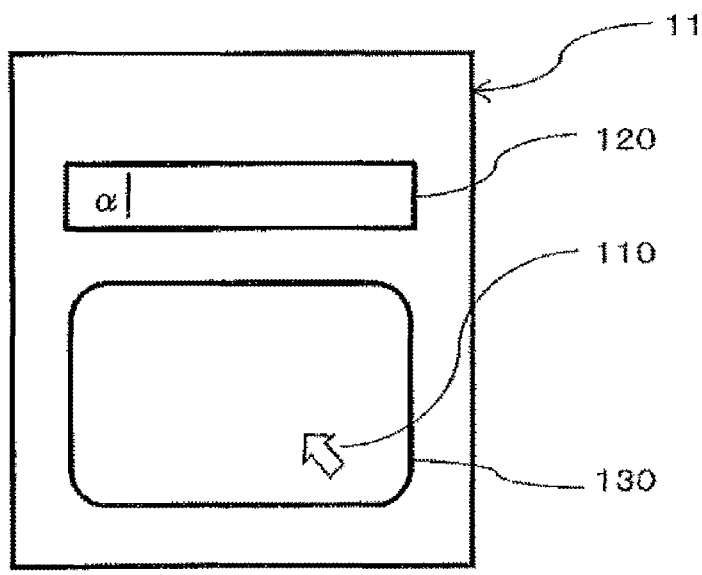

Next, the pointer icon 110 is moved onto the handwriting recognition area 130 to input an arbitrary character string. In the present embodiment, "α", a Greek alphabet, is input onto the handwriting recognition area 130 (FIG. 6D). The control portion 3 conduct the matching process with the character database (not shown) stored in the memory portion 3 once a character string is input to convert the handwritten a character string to the a character string usable in the applications. The Greek alphabet "α" which is the converted a character string is shown in the text box 120 used in the applications (FIG. 6E).

The above process is executed for every input operation of the touch pad 12 and it is possible to input an arbitrary character string to the text box 120.

In the present embodiment, the handwriting recognition area 130 is shown on the display 11 and is controlled to input a character string within the handwriting recognition area 130 from the touch pad 12, but, other than the above, the whole screen of the display 11 may be determined as the handwriting recognition area or the input operation from the touch pad 12 after selecting an object for inputting a character string such as the text box 12 may be determined as the handwriting recognition.

Further, in case the handwriting recognition is not conducted, a keyboard may be shown to input a character string to the display 11 with the operation of the input portion 7 and the touch pad 12.

(Second Energy Saving Mode Transition Movement)

Second energy saving mode transition movement of the wearable information terminal 1 is explained using the flowchart of FIG. 7. The control portion 3 receives a signal showing an inclination from the sensor 13 to calculate the angle of the inclination from the reference axis based on the signal and stores the angle of the inclination from the current reference axis of the wearable information terminal 1 to the memory portion 5 (S10). This is a preprocess to continuously detect the angle of the inclination of the sensor to determine whether there is any change in the angle of the inclination to be used to compare the inclination against the wearable information terminal 1 detected by the sensor 13 in the next step.

Next, an angle of the inclination stored in the memory portion 5 and an angle of the inclination detected by the sensor 13 this time are compared to determined whether both angles are different or not (S20). In the present embodiment, it is to determine whether the angle of the inclination stored in the memory portion 5 and the angle of the inclination detected by the sensor 13 are different or not and in case the difference of both angles is more than the predetermined figure or in case the difference of both angles is more than the predetermined range, it may control to determine that both figures are different. In such case, if the difference of both figures is large or the difference of both figures is more than the predetermined range, the difference of the angle of the inclination of the wearable information terminal 1 is large, that is to say, it is possible to determine that the user is walking or exercising waving the arms.

In case it is determined that both figures are different (S20: YES), to compare the angle of the inclination continuously, the angle of the inclination detected by the sensor 13 this time is stored to the memory portion 5 (S30). On the other hand, in case it is not determined that both figures are different (S20: NO), it is determined that the wearable information terminal 1 is in stationary condition and the process is terminated.

Following to the process of Step S30, the control portion 3 determines whether a predetermined time has lapsed from the time current process started (S40). For measurement of the time, using a timer not shown, the lapsed time is measured by starting the timer at the point the process is started by the control portion 3. Further, the predetermined time may be stored in the memory portion 3 and the user may arbitrary change it using the touch pad 12 or the input portion 7. In case it is determined that it is before the predetermined time lapsed (S40: NO), the process from Step S20 is repeated once again to detect the change in the inclination.

In case it is determined that the predetermined time has lapsed (S40: YES), it is determined whether an operation to the touch pad 12 by the control portion 3 is detected (S50). In case the operation to the touch pad 12 is detected (S50: YES), it is determined that the user has started the operation of the wearable information terminal 1 and the process is terminated. On the other hand, in case it is determined that the operation to the touch pad 12 by the control portion 3 is not detected (S50: NO), the user may be walking or exercising wearing the wearable information terminal 1 on the arm and, in such case, the display 11 transitions from the start up mode to the energy saving mode (S60).

(Object Selection and Movement of the Pointer Icon)

Figure 8A:
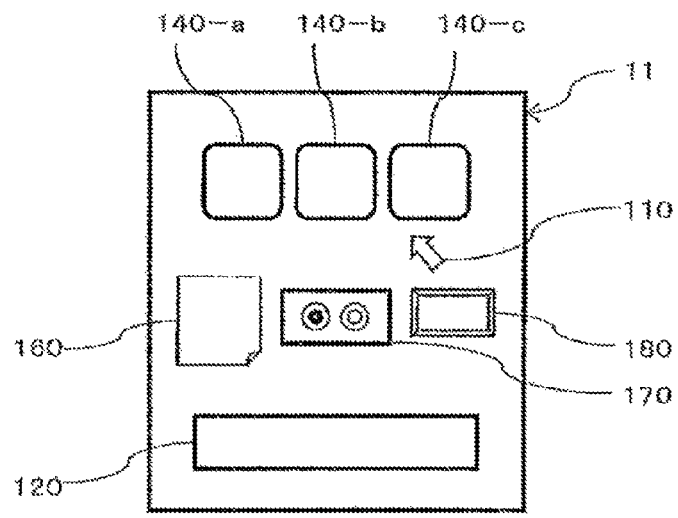
FIGS. 8A through 8C show a display example of the display of the wearable information terminal.
Figure 8B:
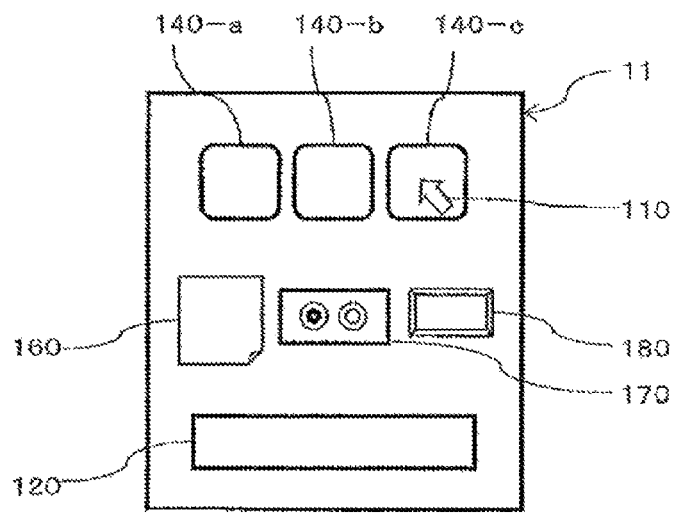
Figure 8C:
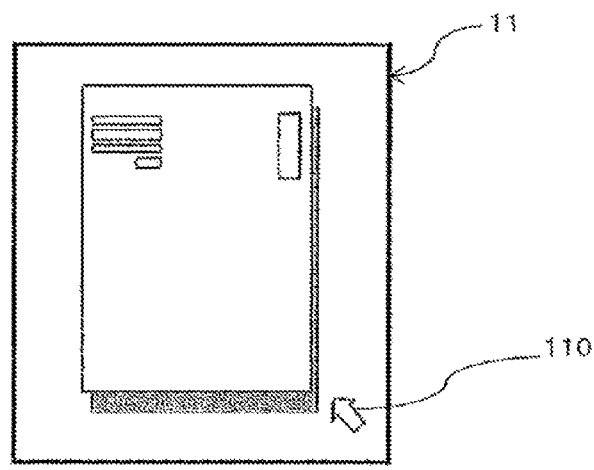
Figure 9:
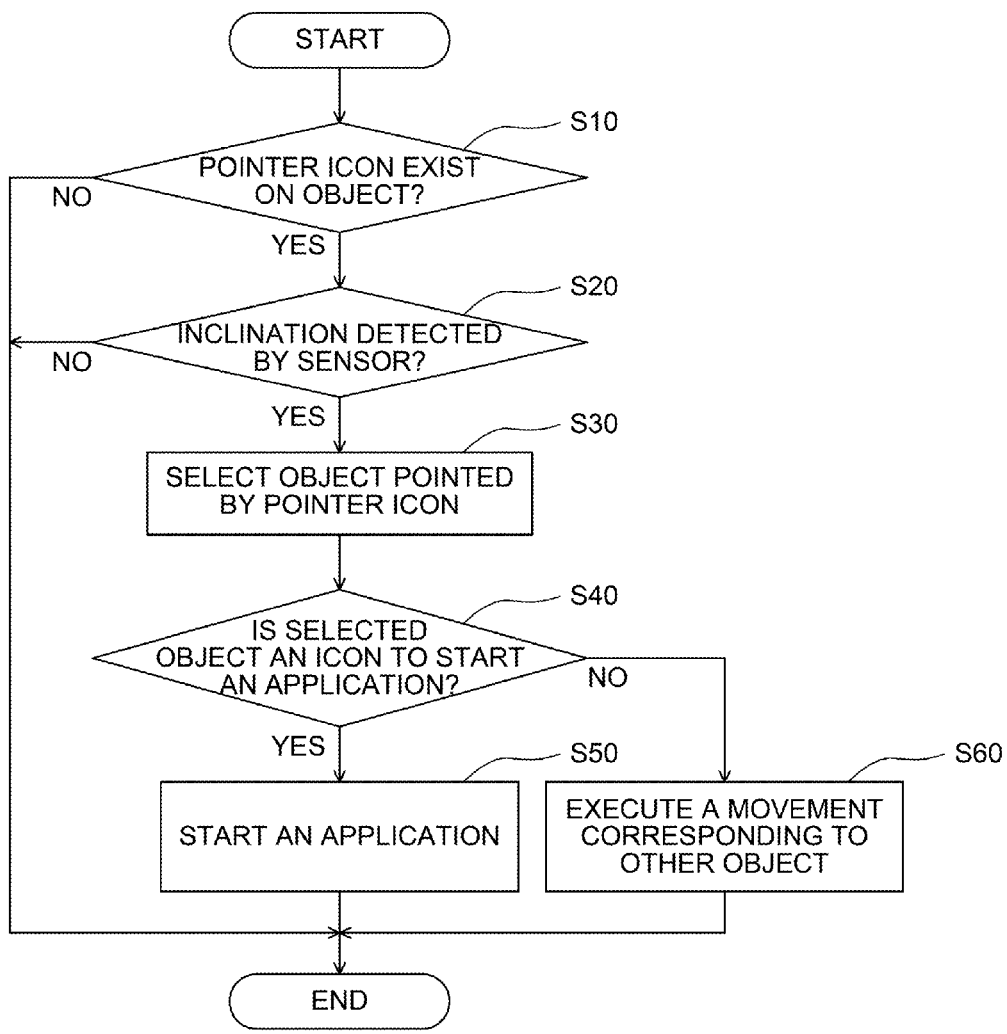
FIG. 9 shows a processing flow of object selection executed by the wearable information terminal.

A selection process of an object using the inclination of the wearable information terminal 1 is explained using the display example of FIGS. 8A-8C and the flowchart of FIG. 9. On the display 11, a plurality of objects with different functions is shown (FIG. 8A). In the present embodiment, a plurality of icons 140-a~140-c to start up applications on the wearable information terminal 1, a file 160, a check box 170, a button 180 and a text box 120 are shown. The control portion 3 detects whether the pointer icon 110 exists on the objects (S10). In case the pointer icon 110 does not exist on the objects (S10: NO), the process is terminated.

As shown in FIG. 8B, in case the pointer icon 110 exists on the icon 140-c which is one of the objects (S10: YES), the sensor 13 detects whether the inclination against the reference axis of the wearable information terminal 1 is changed (S20). This change includes a case where the wearable information terminal 1 is inclined only to the predetermined angle after moving the pointer icon 110 onto the icon 140-c or a case, after it has been changed from an angle of the inclination of one side to another angle's inclination, the angle has been changed to the first angle's inclination again.

In case the change of inclination in Step S20 is not detected (S20: NO), the process is terminated. On the other hand, in case the change in the inclination in the Step 20 is detected (S20: YES), the object shown by the pointer icon 110 (the icon 140-c) is selected (S30). In case the selected object is an icon to start up an application (S40: YES), an application associated to the icon 140-c selected at Step S30 starts up (S50). On the other hand, in case other objects (file 160, check box 170, button 180, text box 120) are selected (S40: NO), a movement corresponding to the other objects (opening file, selecting check box, clicking button) is executed (S60).

As shown in the above, an operation to the touch pad 12 when executing a movement to the objects such as starting up an application may just to move the pointer icon 110 onto the object and it may be possible to make the operation easy to execute the movement to the objects.

(Change of Moving Speed of the Pointer Icon)

Figure 10:
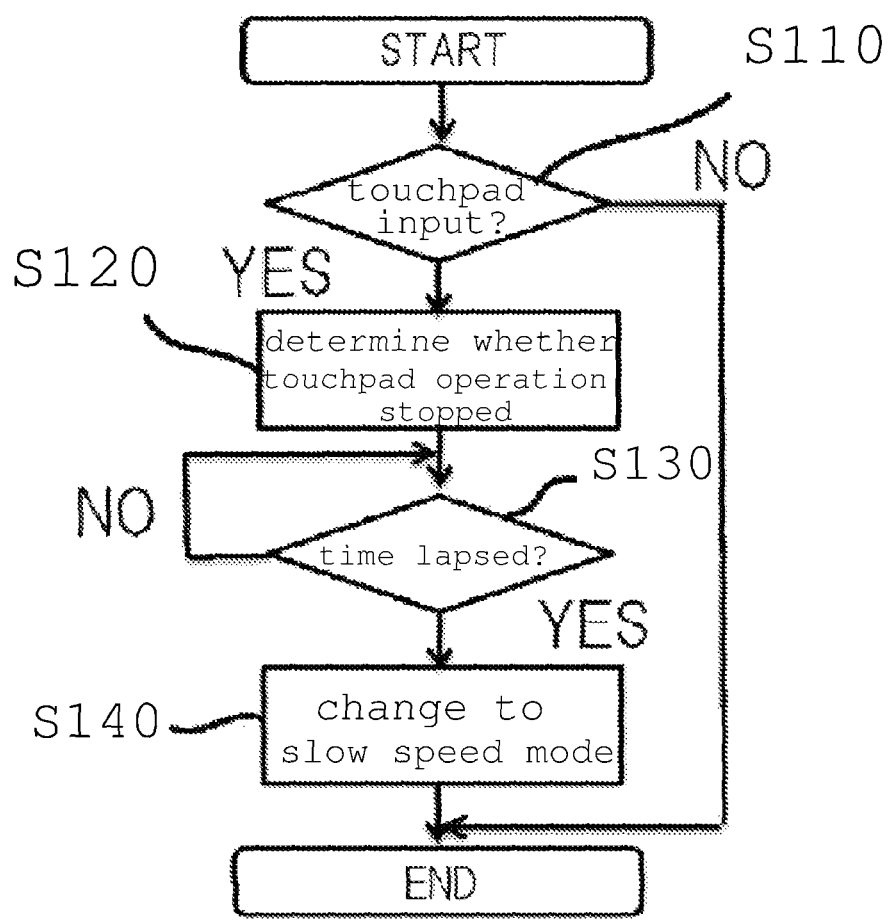
FIG. 10 shows a processing flow of a moving speed change of pointer icon executed by the wearable information terminal.

The changing process of the moving speed of the pointer icon 110 is explained using the flowchart of FIG. 10. The control portion 3 detects whether there is an operation to the touch pad 12 from the user (S110). In case the operation to the touch pad 12 is not detected (S110: NO), the current process is terminated. On the other hand, in case the operation to the touch pad 12 is detected (S110: YES), whether the operation to the touch pad 12 is stopped or not is determined (S120). The operation to the touch pad 12 is stopped means a status where the user made contact with the touch pad 12 with his finger and the finger is not moving.

Next, whether a predetermined time lapsed or not in a state where an operation to the touch pad 12 is stopped is determined S130. An initial amount of the predetermined time is stored in the memory portion 5 and it may be configured to be able to arbitrary change by the control portion 3 or the operation of the touch pad 12. In case the predetermined time is determined to be lapsed with the state where the operation of the touch pad 12 is stopped (S130: YES), the control portion 3 controls to change the moving speed of the pointer icon 110 with the change portion 150 to a slow speed mode slower than the normal speed mode S140.

Further, in case the operation to the touch pad 12 is not present for a predetermined time, the control portion 3 controls to change the moving speed of the pointer icon 110 with the change portion 150 to a normal speed mode faster than the slow speed mode (not shown).

In the present embodiment, the control is conducted to change the moving speed of the pointer icon 110 according to the stationary time of the operation to the touch pad 12, but it may be controlled to change the moving speed according to the input of the input portion 7. As such, by changing the moving speed of the pointer icon 110 to a slower speed than the normal speed, it makes easier to operate the pointer icon 110 when selecting information shown in the display 11.

The abovementioned means and functions are realized by reading and executing the predetermined program with a computer (including CPU, information processing device and other terminals). The application programs are provided in a form stored in computer readable recording medium such as CD (CD-ROM and the like) and DVD (DVD-ROM, DVD-RAM and the like). In this case, the computer reads the application program from the recording medium to forward to store in an internal memory device or an external memory device and execute. Further the program may be recorded in advance to a memory device (memory medium) such as a magnetic disc, an optical disc and an optic magnetic disc, for example, and may be provided from the memory device to the computer through a communication line.

The embodiments of the present invention are explained in the above, however the present invention is not limited to the abovementioned embodiments. Further, the effect indicated in the embodiments of the present invention merely state the most favorable effect delivered with the present invention and the effect of the present invention is not limited to the ones indicated in the embodiment of the present invention.

The present invention is suitable for a wearable terminal used by wearing on an arm. Specifically, as it is a wearable terminal, there is a possibility to face the display screen to various directions and there is a difficult problem to cover the information of the display screen not to be seen by others, however it may be highly possible to overcome such problem by using the present invention. Furthermore, the energy saving capability of the wearable terminal with restriction of battery space is also improved. Additionally, as the wearable terminal is small, if the configuration with the conventional touch panel simply provided in front of the display screen is adopted, it is difficult to operate to input watching at the display screen. However, according to the present invention, it may be highly possible to avoid such problem. Further, it is easy to configure to conduct face recognition as needed even during the input by providing a camera for face recognition or the like to the wearable terminal. As such, it is possible to extend benefit to execute the face recognition and the input operation at the same time by providing a camera for face recognition near the display to take the user's face looking into the display of the wearable terminal and by taking photo of the face with this camera as needed to execute the comparative process with the original data for face recognition stored in advance with the controller of the wearable device.

PARTS LIST

1 Wearable information terminal
2 Battery charger
3 Control portion
4 Communication portion
5 Memory portion
7 Input portion
8 Power control portion
10 Battery charging system
11 Display
12 Touch pad
13 Sensor
14 Terminal housing
15 Information terminal side terminal portion
21 Battery charger housing
22 Battery charger side terminal portion
FIG. 8

S10 Store angle of inclination
S20 Angle of inclination stored and angle of inclination detected by the sensor different?
S30 Store angle of inclination
S40 Predetermined time lapsed?
S50 Operation to touch pad detected?
S60 Switch from start up mode to energy saving mode
FIG. 10
S10 Pointer icon exist on object?
S20 Inclination detected by sensor?
S30 Select object pointed by pointer icon
S40 Is selected object an icon to start an application?
S50 Start an application
S60 Execute a movement corresponding to other object

What is claimed is:

1. A wearable information terminal configured to be worn around a user's arm, comprising:
a housing;
a display supported by the housing;
a controller configured to control operation of the display;
a touchpad positioned such that the display will be located on one side of the user's arm and the touchpad will be located on the other side of the user's arm when the wearable information terminal is worn on the user's arm;
a sensor that is configured to detect an inclination angle of the wearable information terminal; and
an energy-storing member and a data port with the wearable information terminal being configured to recharge the energy-storing member by application of electrical power to the data port;
wherein the controller is configured to cause a pointer icon to be displayed on the display at a position corresponding to an operation location at which the touchpad is touched;
the controller is configured to switch the display to an energy-saving mode in the event 1) the inclination angle is within a predetermined range relative to a reference axis, and 2) no touch is detected at the touchpad for a first predetermined period of time; and
the controller is configured to reset the reference axis in the event the wearable information terminal is held stationary and application of electrical power to the data port is detected.

2. A wearable information terminal configured to be worn around a user's arm, comprising:
a housing;
a display supported by the housing;
a controller configured to control operation of the display;
a touchpad positioned such that the display will be located on one side of the user's arm and the touchpad will be located on the other side of the user's arm when the wearable information terminal is worn on the user's arm; and
a sensor that is configured to detect an inclination angle of the wearable information terminal;
wherein the controller is configured to cause a pointer icon to be displayed on the display at a position corresponding to an operation location at which the touchpad is touched;
the controller is configured to switch the display to an energy-saving mode in the event 1) the inclination angle is within a predetermined range relative to a reference axis, and 2) no touch is detected at the touchpad for a first predetermined period of time;
the controller is configured to cause a selectable object to be displayed on the display; and
the controller is configured to cause the selectable object to be selected in the event the position on the display of the pointer icon coincides with the position on the display of the selectable object and the inclination angle of the wearable information terminal detected by the sensor has changed.

3. The wearable information terminal according to claim 2, wherein the selectable object is an icon that represents an application and the controller is configured to cause the application to be started when the application-representing icon is selected.

4. A wearable information terminal configured to be worn around a user's arm, comprising:
a housing;
a touch-sensitive display supported by the housing;
a controller configured to control operation of the display;
a touchpad;
a sensor that is configured to detect an inclination angle of the wearable information terminal; and
an energy-storing member and a data port with the wearable information terminal being configured to recharge the energy-storing member by application of electrical power to the data port;
wherein the controller is configured to cause a pointer icon to be displayed on the touch-sensitive display at a position corresponding to an operation location at which the touchpad is touched with a digit and the touchpad is positioned such that the location of the pointer icon on the touch-sensitive display can be controlled without blocking the touch-sensitive display by the user's digit;
the controller is configured to switch the touch-sensitive display to an energy-saving mode in the event 1) the inclination angle is within a predetermined range relative to a reference axis, and 2) no touch is detected at the touchpad for a first predetermined period of time; and
the controller is configured to reset the reference axis in the event the wearable information terminal is held stationary and application of electrical power to the data port is detected.

5. A wearable information terminal configured to be worn around a user's arm, comprising:
a housing;
a touch-sensitive display supported by the housing;
a controller configured to control operation of the display;
a touchpad; and
a sensor that is configured to detect an inclination angle of the wearable information terminal;
wherein the controller is configured to cause a pointer icon to be displayed on the touch-sensitive display at a position corresponding to an operation location at which the touchpad is touched with a digit and the touchpad is positioned such that the location of the pointer icon on the touch-sensitive display can be controlled without blocking the touch-sensitive display by the user's digit;
the controller is configured to switch the touch-sensitive display to an energy-saving mode in the event 1) the inclination angle is within a predetermined range relative to a reference axis, and 2) no touch is detected at the touchpad for a first predetermined period of time;
the controller is configured to cause a selectable object to be displayed on the touch-sensitive display; and
the controller is configured to cause the selectable object to be selected in the event the position on the touch-sensitive display of the pointer icon coincides with the position on the touch-sensitive display of the selectable object and the inclination angle of the wearable information terminal detected by the sensor has changed.

6. The wearable information terminal according to claim 5, wherein the selectable object is an icon that represents an application and the controller is configured to cause the application to be started when the application-representing icon is selected.

* * * * *